United States Patent
Matsushita

(10) Patent No.: US 9,241,363 B2
(45) Date of Patent: Jan. 19, 2016

(54) SHORT-RANGE WIRELESS COMMUNICATION APPARATUS AND SYSTEM

(75) Inventor: Suguru Matsushita, Obu (JP)

(73) Assignee: DENSO CORPORATION, Kariya (JP)

( * ) Notice: Subject to any disclaimer, the term of this patent is extended or adjusted under 35 U.S.C. 154(b) by 92 days.

(21) Appl. No.: 13/528,019

(22) Filed: Jun. 20, 2012

(65) Prior Publication Data

US 2012/0329396 A1 Dec. 27, 2012

(30) Foreign Application Priority Data

Jun. 22, 2011 (JP) ................. 2011-138372

(51) Int. Cl.
*H04W 74/08* (2009.01)
*H04W 76/02* (2009.01)
*H04W 84/18* (2009.01)

(52) U.S. Cl.
CPC ........ *H04W 76/025* (2013.01); *H04W 74/0875* (2013.01); *H04W 76/023* (2013.01); *H04W 84/18* (2013.01)

(58) Field of Classification Search
None
See application file for complete search history.

(56) References Cited

U.S. PATENT DOCUMENTS

| 2006/0079182 | A1  | 4/2006  | Matsuda |
| 2008/0051156 | A1* | 2/2008  | Matsuda ............... 455/569.2 |
| 2009/0292851 | A1* | 11/2009 | Mead et al. ............. 710/303 |
| 2010/0070637 | A1  | 3/2010  | Saito et al. |
| 2010/0075605 | A1* | 3/2010  | Yoneda et al. ............ 455/41.3 |
| 2010/0184376 | A1  | 7/2010  | Matsuda |
| 2010/0197362 | A1  | 8/2010  | Saitoh et al. |
| 2011/0230140 | A1  | 9/2011  | Matsuda |
| 2011/0237191 | A1  | 9/2011  | Saito et al. |
| 2011/0250843 | A1* | 10/2011 | Heo ..................... 455/41.2 |
| 2012/0196583 | A1* | 8/2012  | Kindo .................... 455/415 |
| 2013/0029604 | A1  | 1/2013  | Saito et al. |

FOREIGN PATENT DOCUMENTS

JP 2003-078607 3/2003
JP 2008-261867 10/2008

(Continued)

OTHER PUBLICATIONS

Specification of the Bluetooth System, vol. 1, Core, version 1.1, Feb. 28, 2001.*

(Continued)

*Primary Examiner* — Ping Hsieh
*Assistant Examiner* — James Yang
(74) *Attorney, Agent, or Firm* — Harness, Dickey & Pierce, P.L.C.

(57) ABSTRACT

A short-range wireless communication apparatus comprising an own connection device and a control device is disclosed. The own connection device is capable of connecting a first predetermined communication protocol to a communication-destination-side connection device. The control device performs a first connection process of connecting the first predetermined communication protocol between the own connection device and the communication-destination-side connection device. The control device performs the first connection process at a time that is outside a period during which a second connection process of connecting a second predetermined communication protocol between the communication-destination-side connection device and a different connection device is performed.

15 Claims, 8 Drawing Sheets

(56) References Cited

FOREIGN PATENT DOCUMENTS

| | | |
|---|---|---|
| JP | 2009-118313 | 5/2009 |
| WO | WO 2011/145314 | 11/2011 |

OTHER PUBLICATIONS

Office action dated Dec. 4, 2013 in corresponding Chinese Application No. 201210210776.7.
Office action dated May 14, 2014 in corresponding Chinese Application No. 201210210776.7.

* cited by examiner

SHORT-RANGE WIRELESS COMMUNICATION APPARATUS AND SYSTEM

CROSS REFERENCE TO RELATED APPLICATION

The present application is based on and claims priority to Japanese Patent Application No. 2011-138372 filed on Jun. 22, 2011, disclosure of which is incorporated herein by reference.

TECHNICAL FIELD

The present disclosure relates to a short-range wireless communication apparatus that can connect a predetermined communication protocol to a communication destination apparatus through a short-range wireless communication link. The present disclosure also relates to a short-range wireless communication system including a short-range wireless communication apparatus.

BACKGROUND

In a known system, multiple short-range wireless communication apparatuses can connect respective short-range wireless communication links to a single short-range wireless communication apparatus (also referred to as communication destination apparatus). The short-range wireless communication is, for example, Bluetooth (registered trademark) communication. For such a system, see JP 2010-68406A1 corresponding to U.S. 2010/0070637A1.

In this relation, the inventor of the present application has found out the following.

In the system in which multiple short-range wireless communication apparatuses can connect respective short-range wireless communication links to a single communication destination apparatus, if, for instance, the multiple short-range wireless communication apparatuses simultaneously change from a power-off state to a power-on state and simultaneously send a communication protocol connection request (communication protocol may be a profile in Bluetooth communication) to the communication destination apparatus, a connection process of connecting one communication protocol between one of the short-range wireless communication apparatuses and the communication destination apparatus conflicts with a connection process of connecting another communication protocol between another one of the short-range wireless communication apparatuses and the communication destination apparatus. If such a connection process confliction occurs, all the communication protocol connection requests sent from the multiple short-range wireless communication apparatuses may be rejected by the communication destination apparatus. In this case, none of the multiple short-range wireless communication apparatuses can connect a communication protocol to the communication destination apparatus.

If the multiple short-range wireless communication apparatuses simultaneously change from the power-on state to the power-off state in a state where a communication protocol is connected between any one of multiple short-range wireless communication apparatuses and the communication destination apparatus, the following situation can arise. A first short-range wireless communication apparatus (a first one of the multiple short-range wireless communication apparatuses) sends a request to connect a first communication protocol to the communication destination apparatus before the completion of a disconnection process of disconnecting a second communication protocol between a second short-range wireless communication apparatus and the communication destination apparatus. In this case, a connection process of connecting the first communication protocol between the first short-range wireless communication apparatus and the communication destination apparatus conflicts with the disconnection process of disconnecting the second communication protocol between the second short-range wireless communication apparatus and the communication destination apparatus. If such a conflict occurs between the connection process and the disconnection process, the request to connect the first communication protocol, which is sent from the first short-range wireless communication apparatus, may be rejected by the communication destination apparatus. In this case, the first short-range wireless communication apparatus cannot connect the communication protocol to the communication destination apparatus.

SUMMARY

The present disclosure has been made in view of the foregoing. It is an object of the present disclosure to provide a short-range wireless communication apparatus and a short-range wireless communication system that are capable of appropriately controlling communication protocol connection even when a plurality of connection devices connects respective short-range wireless communication links to a single communication-destination-side connection device.

According to a first example of the present disclosure, a short-range wireless communication apparatus comprises: an own connection device that is capable of connecting a first predetermined communication protocol to a communication-destination-side connection device through a short-range wireless communication link; and a control device that performs a first connection process of connecting the first predetermined communication protocol between the own connection device and the communication-destination-side connection device. The control device performs the first connection process at a time that is outside a period during which a second connection process of connecting a second predetermined communication protocol between the communication-destination-side connection device and a different connection device is performed. The first and second predetermined communication protocols are different protocols. The different connection device is a connection device other than the own connection device and the communication-destination-side connection device.

According to a first example of the present disclosure, a short-range wireless communication apparatus comprises: a own connection device that is capable of connecting a first predetermined communication protocol to a communication-destination-side connection device through a short-range wireless communication link; and a control device that performs a connection process of connecting the first predetermined communication protocol between the own connection device and the communication-destination-side connection device. The control device performs the connection process at a time that is outside a period during which a disconnection process of disconnecting a second predetermined communication protocol, which is connected between the communication-destination-side connection device and a different connection device through the short-range wireless communication link, is performed. The first and second predetermined communication protocols are different protocols. The different connection device is a connection device other than the own connection device and the communication-destination-side connection device.

According to a first example of the present disclosure, a short-range wireless communication system comprises: a short-range wireless communication apparatus described above; and a notification device that, when the control device is performing the first connection process, notifies that the control device is performing the first connection process.

According to the above short-range wireless communication apparatus and the short-range wireless communication system, it becomes possible to appropriately controlling communication protocol connection even when a plurality of connection devices connects respective short-range wireless communication links to a single communication-destination-side connection device.

BRIEF DESCRIPTION OF THE DRAWINGS

The above and other objects, features and advantages of the present disclosure will become more apparent from the following detailed description made with reference to the accompanying drawings. In the drawings.

DETAILED DESCRIPTION

Figure 1:
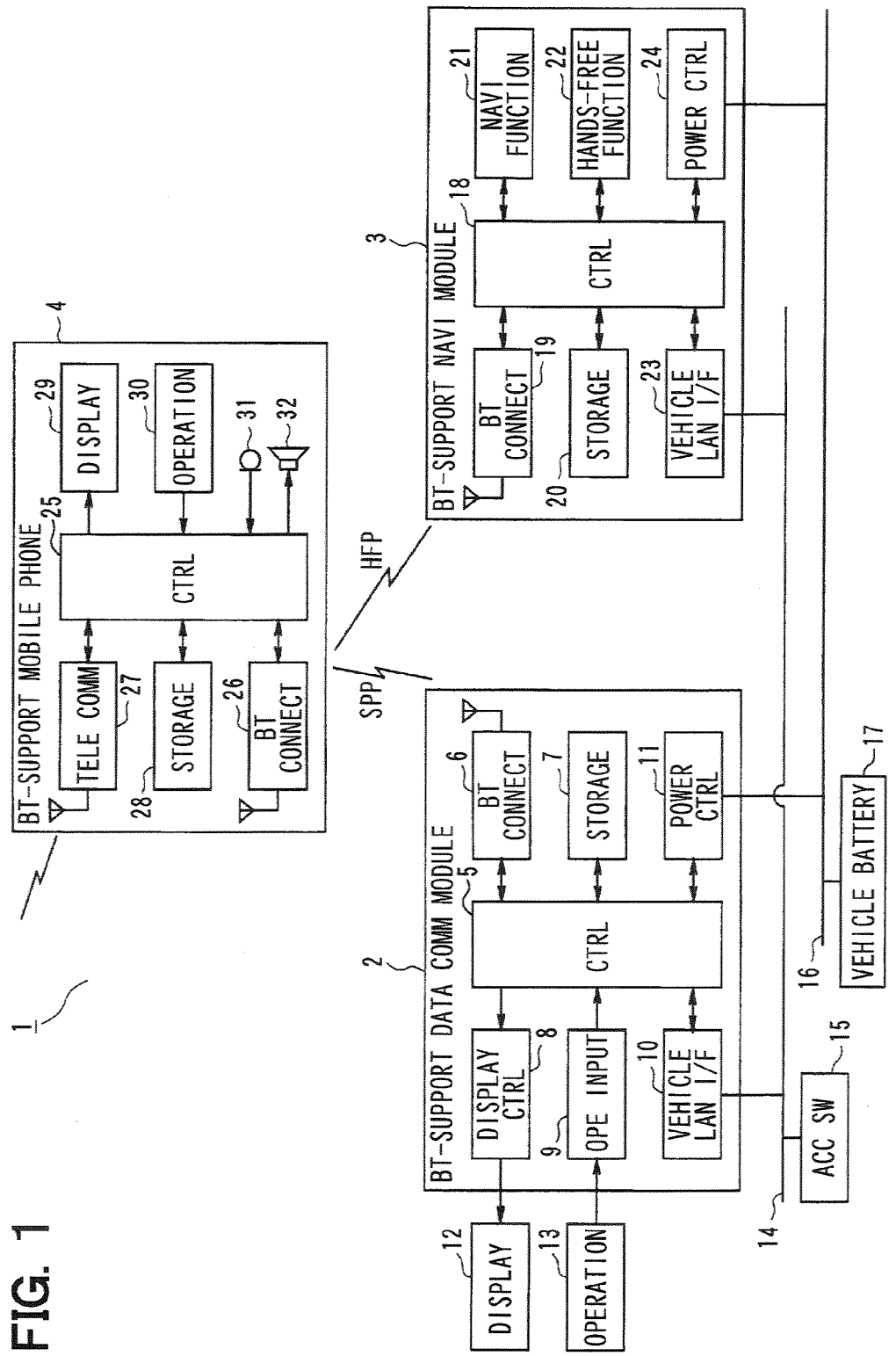
FIG. 1 is a functional block diagram illustrating a BT communication system of one embodiment.

Embodiments will now be described with reference to the accompanying drawings. In one embodiment, a Bluetooth communication system performing Bluetooth (registered trademark) communication is illustrated as an example of short-range wireless communication system. Hereinafter, Bluetooth is abbreviated as BT. The BT communication system 1 includes a BT-supporting data communication module 2 mounted to a vehicle (hereinafter referred to as "data communication module"), a BT-supporting navigation module 3 (hereinafter referred to as the navigation module), and a BT-supporting mobile phone 4 portable by a user (hereinafter referred to as "mobile phone"). When the user carrying the mobile phone 4 rides the vehicle, the data communication module 2 and the navigation module 3 become able to establish BT communication links with the mobile phone 4. The navigation module 3 may be mounted to the vehicle as a standard feature when, for instance, the vehicle is manufactured at a manufacturing plant. After the vehicle is shipped from the manufacturing plant and purchased by the user, the data communication module 2 may be mounted to the vehicle as an optional feature. The data communication module 2 mounted to a vehicle is an example of short-range wireless communication apparatus.

The data communication module 2 includes, for example, a control unit 5 (which is an example of a control means and a control device), a BT connection unit 6 (which is an example of an own connection means and an own connection device), a storage unit 7, a display control unit 8, an operation input unit 9, a vehicle LAN interface 10, and a power supply control unit 11. The control unit 5 includes a microcomputer with, for example, a CPU, a RAM, a ROM, and an I/O bus. The control unit 5 controls generally all of operations of the data communication module 2 such as communication operation, data management operation and the like.

The BT connection unit 6 connects a BT communication link (which is an example of a short-range wireless communication link) between the BT connection unit 6 and a later-described BT connection unit of the mobile phone 4. The BT connection unit 6 also connects various profiles defined by the BT communication standard via the BT communication link. In the present embodiment, the BT connection unit 6 can connect an SPP (serial port profile), which is a profile for defining a virtual serial port for data communication, to the BT connection unit of the mobile phone 4. The SPP is a data communication protocol, which is defined on an individual function basis.

The storage unit 7 has a storage area for storing various data. When the display control unit 8 receives a display command signal from the control unit 5, the display control unit 8 controls a display operation of a display apparatus 12 in accordance with the display command signal. When the operation input unit 9 receives an operation detection signal from an operation apparatus 13 in response to, for example, a user operation on the operation apparatus 13, the operation input unit 9 outputs the input operation detection signal to the control unit 5. The control unit 5 then analyzes the operation detection signal inputted from the operation input unit 9 to identify the user operation. The display apparatus 12 and the operation apparatus 13 are disposed separately from the data communication module 2 (disposed external to the data communication module 2). The operation apparatus 13 may include various touch switches provided on a display screen of the display apparatus 12

The vehicle LAN interface 10 has an input/output function to exchange data with a vehicle LAN 14 of the vehicle. The vehicle LAN interface 10 receives various signals via the vehicle LAN 14. For example, the vehicle LAN interface 10 receives an ACC signal, which is outputted from an ACC (accessory) switch 15 (which is an example of a predetermined switch) to indicate whether the ACC switch 15 is on or off. Additionally, the vehicle LAN interface 10 receives signals indicative of multiple kinds of vehicle behavior from m various ECUs (not shown) and sensors (not shown) via the vehicle LAN 14. For example, the vehicle LAN interface 10 receives a distance signal indicative of a traveled distance and a fuel efficiency signal indicative of the amount of consumed fuel. The power supply control unit 11 is connected to a power supply line 16 mounted to the vehicle to generate operating power from electrical power, which is supplied from a vehicle battery 17 through the power supply line 16. The power supply control unit 11 supplies the generated operating power to various functional blocks.

When the ACC signal is inputted from the ACC switch 15 into the vehicle LAN interface 10 through the vehicle LAN 14, the control unit 5 of the data communication module 2 determines in accordance with the ACC signal whether the ACC switch 15 is on or off, and then turns on or off the operating power for the entire data communication module 2. More specifically, when the control unit 5 determines that the ACC switch 15 has changed from off to on, the control unit 5 supplies the operating power, which is generated from the electrical power supplied from the vehicle battery 17 to the power supply control unit 11 through the power supply line 16, to all the functional blocks to operate the data communication module 2 in a normal operating state. When the control unit 5 determines that the ACC switch 15 has changed from on to off, the control unit 5 supplies the operating power, which is generated from the electrical power supplied from the vehicle battery 17 to the power supply control unit 11 through the power supply line 16, to some of the functional blocks (BT connection unit 6, etc.) to operate the data communication module 2 in a low-consumption operating state, which is lower in power consumption than the normal operating state. In other words, the data communication module 2 operates in the normal operating state when the power is on, and operates in the low-consumption operating state when the power is off.

The navigation module 3 includes, for example, a control unit 18, a BT connection unit 19 (which is an example of a different connection means and a different connection device), a storage unit 20, a navigation function unit 21, a hands-free communication function unit 22, a vehicle LAN interface 23, and a power supply control unit 24. The control, unit 18 includes a microcomputer with, for example, a CPU, a RAM, a ROM and an I/O bus. The control unit 18 controls generally all of operations of the navigation module 3 such as communication operation, data management operation and the like.

As is the case with the earlier-described BT connection unit 6 of the data communication module 2, the BT connection unit 19 connects a BT communication link between the BT connection unit 19 and a later-described BT connection unit of the mobile phone 4. The BT connection unit 19 also connects various profiles defined by the BT communication standard via the BT communication link. In the present embodiment, the BT connection unit 19 can connect an HFP (hands-free profile), which defines hands-free communications, to the BT connection unit of the mobile phone 4. The HFP is also a data communication protocol defined on an individual function basis.

The storage unit 20 has a storage area for storing various data. When, for instance, the BT connection unit 19 connects the HFP to the later-described BT connection unit of the mobile phone 4, the storage unit 20 stores, for example, outgoing call history data and incoming call history data. The outgoing call history data indicates a relationship between outgoing call time and outgoing call phone numbers concerning calls made from the mobile phone 4 to a communication network (not shown). The incoming call history data indicates the relationship between incoming call time and incoming call phone numbers concerning calls made from the network to the mobile phone 4.

The navigation function unit 21 is a functional block that provides navigation functions. The navigation function unit 21 has, for example, a function of determining the present location of the vehicle, a function of setting a destination, a function of calculating a route from the present location of the vehicle to the destination, a function of guiding the route, and a function of reading map data (including road data, intersection data, etc.) from a recording medium and drawing it. The hands-free communication function unit 22 is a functional block that provides a hands-free communication function. The hands-free communication function unit 22 has, for example, a function of modulating an outgoing voice that is emitted from the user and picked up by a microphone (not shown), a function of demodulating an incoming voice and outputting the demodulated incoming voice from a loudspeaker (not shown), and a function of canceling an echo.

As is the case with the earlier-described vehicle LAN interface 10 of the data communication module 2, the vehicle LAN interface 23 has an input/output function for data change with the vehicle LAN 14 mounted to the vehicle. The vehicle LAN interface 23 receives various signals via the vehicle LAN 14. For example, the vehicle LAN interface 23 receives an ACC signal, which is outputted from an ACC (accessory) switch 15 (which is an example of a predetermined switch) to indicate whether the ACC switch 15 is on or off. Additionally, the vehicle LAN interface 23 receives signals indicative of multiple kinds of vehicle behavior from various ECUs (not shown) and sensors (not shown) via the vehicle LAN 14.

The power supply control unit 24 is connected to the power supply line 16 mounted to the vehicle, as is the case with the earlier-described power supply control unit 11 of the data communication module 2, to generate operating power from electrical power, which is supplied from the vehicle battery 17 through the power supply line 16, and supply the generated operating power to various functional blocks.

When the ACC signal is input from the ACC switch 15 into the vehicle LAN interface 23 through the vehicle LAN 14, the control unit 18 in the navigation module 3 determines in accordance with the ACC signal whether the ACC switch 15 is on or off, and then turns on or off the operating power for the entire navigation module 3. More specifically, when the control unit 18 determines that the ACC switch 15 has changed from off to on, the control unit 18 supplies the operating power, which is generated from the electrical power supplied from the vehicle battery 17 to the power supply control unit 24 through the power supply line 16, to all the functional blocks to operate the navigation module 3 in a normal operating state. When the control unit 18 determines that the ACC switch 15 has changed from on to off, the control unit 18 supplies the operating power, which is generated from the electrical power supplied from the vehicle battery 17 to the power supply control unit 24 through the power supply line 16, to some of the functional blocks (BT connection unit 19, etc.) to operate the navigation module 3 in a low-consumption operating state, which is lower in power consumption than the normal operating state. In other words, the navigation module 3 operates in the normal operating state when the power is on, and operates in the low-consumption operating state when the power is off.

The mobile phone 4 includes, for example, a control unit 25, a BT connection unit 26 (which is an example of communication-destination-side connection means and communication-destination-side connection device), a telephone communication unit 27, a storage unit 28, a display unit 29 (which is an example of notification means and notification device), an operation unit 30, a microphone 31, and a loudspeaker 32. The control unit 25 includes a microcomputer with, for example, a CPU, a RAM, a ROM, and an I/O bus. The control unit 25 controls generally all of operations of the mobile phone 4 such as communication operation, data management operation and the like.

The BT connection unit 26 connects a BT communication link to the earlier-described BT connection unit 6 of the data communication module 2 and/or the earlier-described BT connection unit 19 of the navigation module 3, and connects various profiles defined by the BT communication standard via the BT communication link.

If the BT connection unit 26 is designed (configured) to be capable of simultaneously connecting (multi-point connection) the BT communication links to respective multiple BT connection units, the BT connection unit 26 can connect not only the BT communication link to the BT connection unit 6 of the data communication module 2, but also the BT communication link to the BT connection unit 19 of the navigation module 3, In other words, the BT connection unit 26 can not only connect the SPP to the BT connection unit 6 of the data communication module 2, but also connect the HFP to the BT connection unit 19 of the navigation module 3.

If the BT connection unit 26 is designed (configured) not to be capable of the multi-point connection, the BT connection unit 26 cannot simultaneously connect the BT communication link to the BT connection unit 6 of the data communication module 2 and to the BT connection unit 19 of the navigation module 3. In other words, the BT connection unit 26 selectively connects the BT communication link to either the BT connection unit 6 of the data communication module 2 or the BT connection unit 19 of the navigation module 3. More specifically, the BT connection unit 26 selectively connects the SPP and the HFP because it cannot connect the HFP to the BT connection unit 19 of the navigation module 3 while the SPP is being connected to the BT connection unit 6 of the data communication module 2, and cannot connect the SPP to the BT connection unit 6 of the data communication module 2 while the HFP is being connected to the BT connection unit 19 of the navigation module 3.

The telephone communication unit 27 performs telephone communication via a communication network, which may include a mobile phone network and/or a fixed-line phone network. The storage unit 28 has a storage area for storing various data such as outgoing call history data, incoming call history data, and phone book data. The outgoing call history data indicates the relationship between outgoing call time and outgoing call phone numbers concerning calls made from the mobile phone 4 to the communication network. The incoming call history data indicates the relationship between incoming call time and incoming call phone numbers concerning calls made from the network to the mobile phone 4. The phone book data indicates the relationship between registered names, phone numbers, and e-mail addresses.

When a display command signal is input from the control unit 25, the display unit 29 opens a relevant display screen in accordance with the input display command signal. The operation unit 30 has various user-operable keys, such as a call start key, a call and key, and numeric keys ("0" to "9"). When the user operates one or more keys, the operation unit 30 outputs an operation detection signal to the control unit 25. The control unit 25 then analyzes the operation detection signal inputted from the operation unit 30 and determines the operation performed by the user. Further, the control unit 25 has various functions such as a function of modulating an outgoing voice that is emitted from the user and picked up by the microphone 31 and a function of demodulating an incoming voice and outputting the demodulated incoming voice from the loudspeaker 32.

When, the control unit 18 in the navigation module 3 determines that the ACC switch 15 has changed from off to on, the control unit 18 changes the navigation module 3 from a power-off state to a power-on state. Immediately after the navigation module 3 is changed from the power-off state to the power-on state, the control unit 18 causes the BT connection unit 19 to transmit a search signal and searches for a apparatus registered as a BT communication destination (e.g., up to five apparatuses). If, in this instance, the mobile phone 4 is registered as a BT communication destination for the navigation module 3, turned on, carried into the vehicle, and positioned within a BT communication range formed by the BT connection unit 19, the mobile phone 4 receives the search signal from the navigation module 3 and transmits a search response signal to the navigation module 3 to acknowledge the receipt of the search signal.

When the control unit 18 in the navigation module 3 determines that the BT connection unit 19 has received the search response signal from the mobile phone 4, the control unit 18 initiates a BT communication link connection process to connect the BT communication link between the BT connection unit 19 and the BT connection unit 26. When the control unit 18 determines that the BT communication link connection process is normally completed and that the BT communication link is successfully connected, the control unit 18 initiates an HFP connection process to connect the HFP between the BT connection unit 19 and the BT connection unit 26. When the control unit 18 determines that the HFP connection process is normally completed and that the HFP is successfully connected, the control unit 18 maintains the HFP connection. When the mobile phone 4 gets called via the communication network while the HFP is being connected between the BT connection unit 19 and the BT connection unit 26, an incoming call notification signal is transmitted from the BT connection unit 26 to the BT connection unit 19 to let the display unit 29 open an incoming call screen and the loudspeaker 32 emit an incoming call sound. In this manner, the user is notified of the incoming call the mobile phone 4 is receiving from the communication network.

When the control unit 18 determines that the ACC switch 15 has changed from on to off, the control unit 18 changes the navigation module 3 from the power-on state to the power-off state and initiates an HFP disconnection process to disconnect the HFP connection between the BT connection unit 19 and the BT connection unit 26.

Meanwhile, when the control unit 5 of the data communication module 2 determines that the ACC switch 15 has changed from off to on, the control unit 5 changes the data communication module 2 from, the power-off state to the power-on state. Immediately after the data communication module 2 is changed from the power-off state to the power-on state, the control unit 5 causes the BT connection unit 6 to transmit a search signal and searches for a apparatus registered as a BT communication destination (e.g., up to five apparatuses). If, in this instance, the mobile phone 4 is registered as a BT communication destination for the data communication module 2, turned on, carried into the vehicle, and positioned within a BT communication range formed by the BT connection unit 6, the mobile phone 4 receives the search signal from the data communication module 2 and transmits a search response signal to the data communication module 2 to acknowledge the receipt of the search signal.

When the control unit 5 of the data communication module 2 determines that the BT connection unit 6 has received the search response signal from the mobile phone 4, the control unit 5 does not initiate a BT communication link connection process of connecting the BT communication link between the BT connection unit 6 and the BT connection unit 26 immediately after the conclusion, but initiates the BT communication link connection process after the elapse of a first predetermined time (detailed later). When the control unit 5 determines that the BT communication link connection process is normally completed and that the BT communication link is successfully connected, the control unit 5 initiates an SPP connection process to connect the SPP between the BT connection unit 6 and the BT connection unit 26.

The above-mentioned first predetermined time will now be described. The first predetermined time is a period of time that is used to avoid a collision between the SPP connection process performed by the BT connection unit 6 of the data communication module 2 and the HFP connection process performed by the BT connection unit 19 of the navigation module 3.

In the BT communication system 1, both of the navigation module 3 and the data communication module 2 are turned on/off in response to the turn on/off of the ACC switch 15. Thus, the navigation module 3 and the data communication module 2 simultaneously change from the power-off state to the power-on state.

In the above instance, the BT connection unit 19 initiates the HFP connection process immediately after the navigation module 3 changes from the power-off state to the power-on state. Therefore, if the BT connection unit 6 initiates the SPP connection process immediately after the data communication module 2 is changed from the power-off state to the power-on state, the HFP connection process performed by the BT connection unit 19 collides with the SPP connection process performed by the BT connection unit 6. In view of this, the present embodiment does not allow the BT connection unit 6 to initiate the SPP connection process immediately after the data communication module 2 is changed from the power-off state to the power-on state; in stead, the BT connection unit 6 initiates the SPP connection process after the elapse of the first predetermined time from the change of the data communication module 2 from the power-off state to the power-on state.

The first predetermined time, which may start from the initiation of the HFP connection process in response to the change of the navigation module 3 from the power-off state to the power-on state, is a power-on-case wait time to wait for the normal completion of the HFP connection process. The first predetermined time can be determined from the following equation:

First predetermined time=number of registered apparatuses (devices)×search time for each apparatus (paging time)+profile connection processing time.

The number of registered apparatuses is the number of apparatuses registered as a BT communication destination for the navigation module 3. For example, the maximum number of such apparatuses is 5. The search time for one apparatus is a period of time for determining whether a target apparatus is present in the BT communication range. The search time defined by the BT communication standard is 5.12 seconds. The profile connection processing time is a period of time required for the BT connection unit 19 of the navigation module 3 to initiate and normally complete a profile connection process of connecting a profile. It depends on the number of profiles to be connected.

More specifically, if the navigation module 3 is designed (configured) to, for example, connect only the HFP at a time of power-on of the navigation module 3 (the change from the power-off state to the power-on state), the profile connection processing time is a period of time required for connecting the HFP. If the navigation module 3 is designed (configured) to, for example, connect the HFP and a PBAP (phone book access profile for defining the transfer of phone book data) at the time of the power-on of the navigation module 3, the profile connection processing time is the sum of a period of time required for connecting the HFP and a period of time required for connecting the PBAP. The profile connection processing time may vary from one profile to another.

When the control unit 5 of the data communication module 2 determines that the ACC switch 15 has changed from on to off, the control unit 5 changes the data communication module 2 from the power-on state to the power-off state, Immediately after the data communication module 2 is changed from the power-on state to the power-off state, the control unit 5 causes the BT connection unit 6 to transmit a search signal and searches for a apparatus registered as a BT communication destination (e.g., up to five apparatuses). If, in this instance, the mobile phone 4 is registered as a BT communication destination for the data communication module 2, turned on, carried into the vehicle, and positioned within a BT communication range formed by the BT connection unit 6, the mobile phone 4 receives the search signal from the data communication module 2 and transmits a search response signal to the data communication module 2 to acknowledge the receipt of the search signal.

When the control unit 5 of the data communication module 2 determines that the BT connection unit 6 has received the search response signal from the mobile phone 4, the control unit 5 does not initiate a BT communication link connection process of connecting the BT communication link between the BT connection unit 6 and the BT connection unit 26 immediately after the conclusion, but initiates the BT communication link connection process after the elapse of a second predetermined time (detailed later). When the control unit 5 determines that the BT communication link connection process is normally completed and that the BT communication link is successfully connected, the control unit 5 initiates an SPP connection process to connect the SPP between the BT connection unit 6 and the BT connection unit 26.

The second predetermined time will be described The second predetermined time is a period of time that is used to avoid a collision between the SPP connection process performed by the BT connection unit 6 of the data communication module 2 and the HFP disconnection process performed by the BT connection unit 19 of the navigation module 3. In the above instance, the BT connection unit 19 initiates the HFP disconnection process immediately after the navigation module 3 changes from the power-on state to the power-off state. Therefore, if the BT connection unit 6 initiates the SPP connection process immediately after the data communication module 2 is changed from the power-on state to the power-off state, the HFP disconnection process performed by the BT connection unit 19 collides with the SPP connection process performed by the BT connection unit 6. In view of the above circumstances, the present embodiment does not allow the BT connection unit 6 to initiate the SPP connection process immediately after the data communication module 2 is changed from the power-on state to the power-off state; instead, the BT connection unit 6 initiates the SPP connection process after the elapse of the second predetermined time from the change of the data communication module 2 from the power-on state to the power-off state.

The second predetermined time, which may start from the initiation of the HFP disconnection process in response to the change of the navigation module 3 from the power-on state to the power-off state, is a power-off case wait time to wait for the normal completion of the HFP disconnection process. The second predetermined time can be determined from the following equation:

Second predetermined time=profile disconnection processing time

The profile disconnection processing time is a period of time required for the BT connection unit 19 of the navigation module 3 to initiate and normally complete a profile disconnection process of disconnecting a connected profile. The second predetermined time depends on the number of profiles to be disconnected. More specifically, if the navigation module 3 is designed (configured) to, for example, disconnect only the connected HFP at a time of the power-off of the navigation module 3 (the change from the power-on state to the power-off state), the profile disconnection processing time is a period of time required for disconnecting the connected HFP. If the navigation module 3 is designed (configured) to disconnect the connected HFP and a MAP (message access profile for defining the transfer of e-mail data) at the time of whether power-off of the navigation module 3, the profile disconnection processing time is the sum of a period of time required for disconnecting the connected HFP and a period of time required for disconnecting the MAP. The profile disconnection processing time may vary from one profile to another.

As described above, the navigation module 3 may be mounted to the vehicle as a standard feature when, for instance, the vehicle is manufactured at a manufacturing plant, and the data communication module 2 may be mounted to the vehicle as an optional feature when, for instance, the vehicle is shipped from the manufacturing plant and purchased by the user. In other words, the navigation module 3 is mounted to the vehicle before the data communication module 2 is mounted to the vehicle. Therefore, in a stage where the data communication module 2 is to be mounted to the vehicle, the user (a vehicle owner, a service technician who mounts the data communication module 2, etc.) can obtain information, for instance, about the number of apparatuses registered for the navigation module 3, a profile to be connected when the navigation module 3 turns on, and a profile to be disconnected when the navigation module 3 turns off. As such being the case, the user can set the first predetermined time and the second predetermined time in the control unit 5 by entering appropriate numerical values into the operation apparatus 13 in accordance with the information obtained by the user.

Further, the control unit 5 of the data communication module 2 cannot directly determine the timing at which the navigation module 3 changes from the power-off state to the power-on state and the timing at which the navigation module 3 changes from the power-on state to the power-off state. However, both of the navigation module 3 and the data communication module 2 are turned on/off in conjunction with the on/off operation of the ACC switch 15. Therefore, in accordance with the ACC signal inputted from the ACC switch 15 to the vehicle LAN interface 10 through the vehicle LAN 14, the control unit 5 can indirectly determine the timing at which the navigation module 3 changes from the power-off state to the power-on state and the timing at which the navigation module 3 changes from the power-on state to the power-off state.

Figure 2:
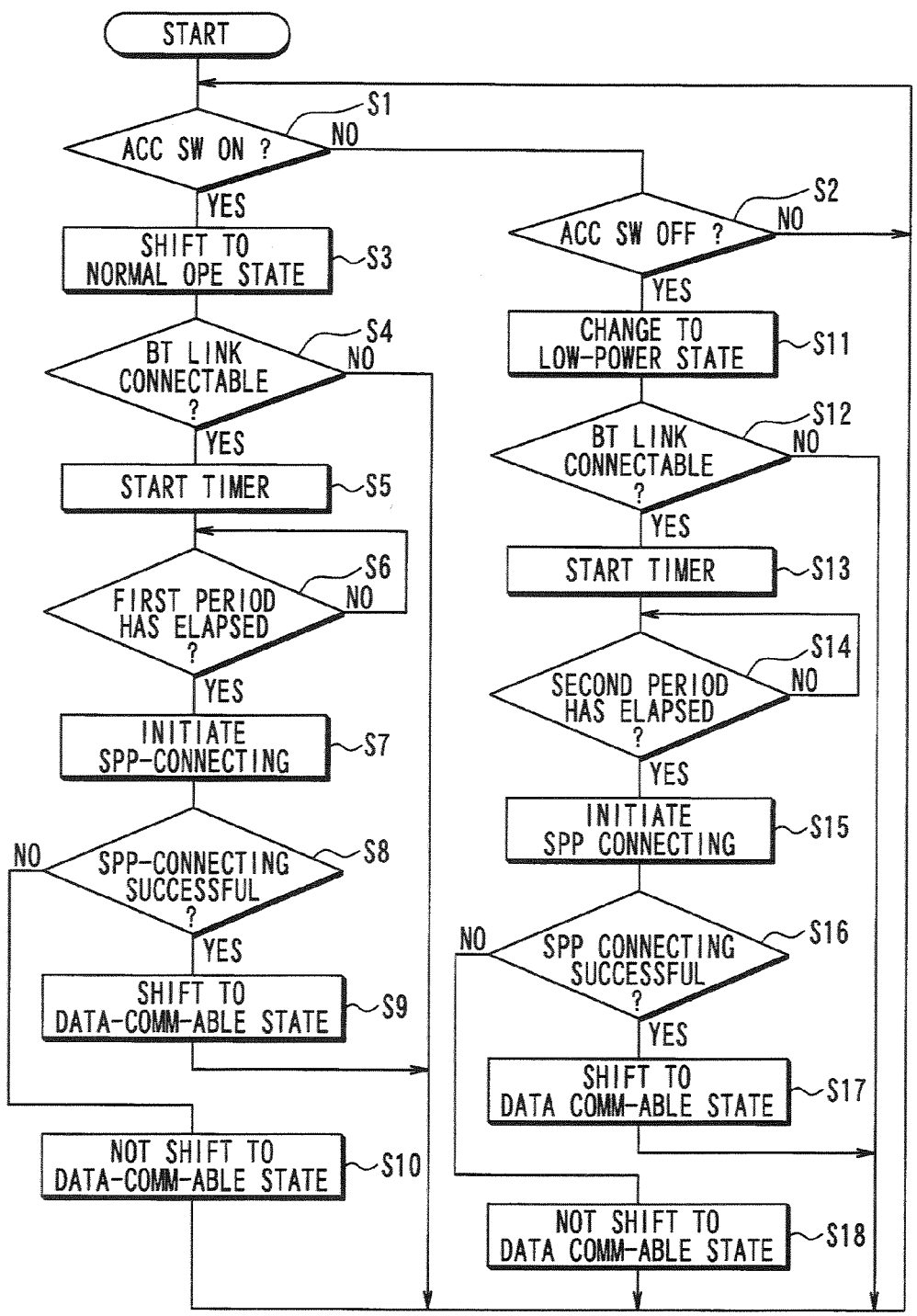
FIG. 2 is a flowchart illustrating a process performed by a control unit of a data communication module.

Operations performed by the BT communication system 1 will now be described with reference to FIGS. 2 to 8. FIG. 2 is a flowchart illustrating a process performed by the control unit 5 of the data communication module 2. Here, the SPP connection process of connecting the SPP can correspond to a connection process (a first connection process). The SPP can correspond to a first predetermined communication protocol and a data communication protocol. The HFP connection process of connecting the HFP can correspond to a second connection process. The HFP can correspond to a second predetermined communication protocol and a hands-free communication protocol. The HFP disconnection process of disconnecting the HFP corresponds to a disconnection process.

The following setup is assumed. In response to the power-on of the navigation module 3, the navigation module 3 automatically initiates the HFP connection process, so that a hands-free communication during driving of vehicle can be performed during the ON of the navigation module 3. Additionally, in response to the power-off of the navigation module 3, the navigation module 3 automatically initiates the HFP disconnection process. Moreover, in response to the power-on of the data communication module 2, the data communication module 2 automatically initiates the SPP connection process, so that data communication before the start of driving (immediately after riding the vehicle) can be preformed (vehicle data before the start of driving can be uploaded from the data communication module 2 to the mobile phone 4). Additionally, in response to completion of the upload of the vehicle data, the data communication module 2 automatically initiates an SPP disconnection process. Moreover, in response to the power-off of the data communication module 2, the data communication module 2 automatically initiates the SPP connection process, so that the data communication after the end of driving (immediately before the driver leaves the vehicle) can be preformed (specifically, the vehicle data after the end of driving can be uploaded from the data communication module 2 to the mobile phone 4). In response to completion of the upload of the vehicle data, the data communication module 2 automatically initiates the SPP disconnection process.

While the data communication module 2 is being mounted to the vehicle (while the data communication module 2 is having a connection to the ACC switch 15 through the vehicle LAN 14 and connected to the vehicle battery 17 through the power supply line 16), the control unit 5 of the data communication module 2 determines (monitors) whether or not the ACC switch 15 has changed from off to on and determines (monitors) whether or not the ACC switch 15 has changed from on to off (S1 and S2).

When, for instance, the control unit 5 determines that the ACC switch 15 is changed from off to on (corresponding to YES at S1) while the data communication module 2 is operating in a low power consumption operating state, the control unit 5 changes the data communication module 2 from the low power consumption operating state to the normal operating state (S3), so that the data communication module 2 operates in the normal operating state. In the above, the change of the ACC switch 15 from off to on occurs when a key is inserted into a key cylinder and rotated from the off position to the IG (ignition) position by the user Next, the control unit 5 determines whether the BT communication link to the mobile phone 4 can be established (S4). More specifically, the control unit 5 causes the BT connection unit 6 to transmit the search signal and searches for an apparatus registered as a BT communication destination. If the control unit 5 determines that the mobile phone 4 is turned on and carried into the vehicle, and that the search response signal from the mobile phone 4 is received by the BT connection unit 6, the control unit 5 determines that the BT communication link to the mobile phone 4 can be established (corresponding to YES at S4). In this case, the control unit 5 starts a timer for counting the first predetermined time (power-on-case wait time) at S5, and determines whether the first predetermined time is up (has elapsed) at S6. In other words, the control unit 5 determines whether the time counted by the timer reaches the first predetermined time.

When the control unit 5 determines that the first predetermined time is up (corresponding to YES at S6), the control unit 5 initiates the BT communication link connection process of connecting the BT communication link between the BT connection unit 6 and the BT connection unit 26. When the control unit 5 determines that the BT communication link connection process is normally completed, and the BT communication link is successfully connected, the control unit 5 causes the BT connection unit 6 to transmit an SPP connection request signal and initiates the SPP connection process of connecting the SPP between the BT connection unit 6 and the BT connection unit 26 (S7).

Figure 3:
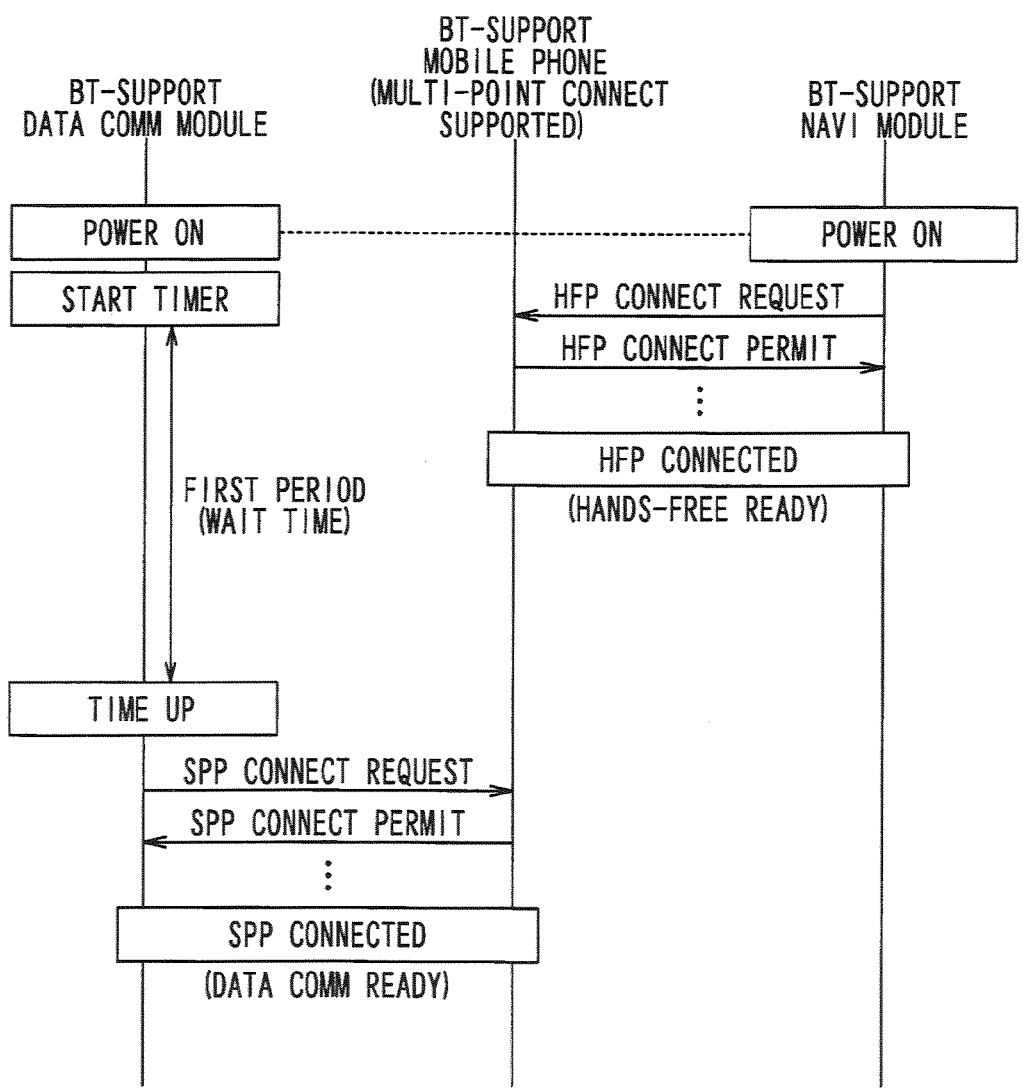
FIG. 3 is a sequence diagram of a data communication module, a mobile phone and a navigation module when the mobile phone supports a multi-point connection.
Figure 4:
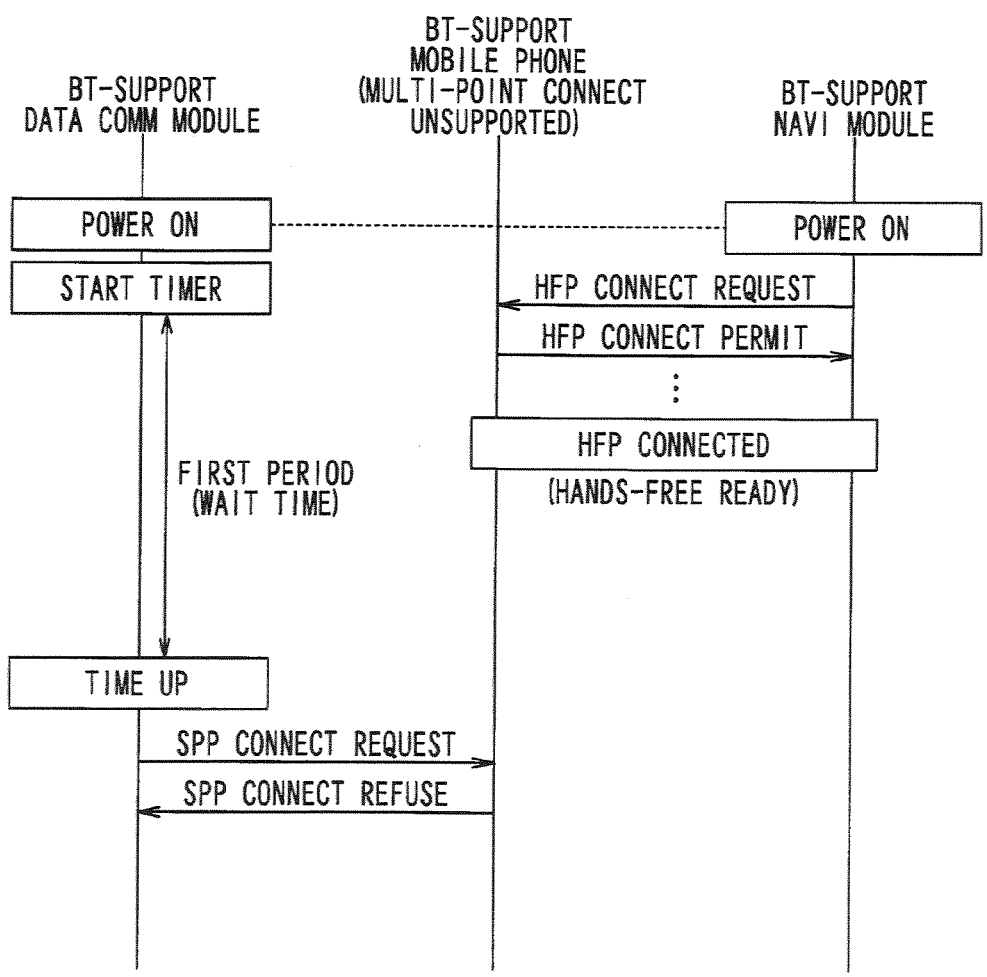
FIG. 4 is a sequence diagram of a data communication module, a mobile phone and a navigation module when the mobile phone does not support the multi-point connection.

When the HFP connection process has been normally finished and the HFP connection between the mobile phone 4 and the navigation module 3 has been established at a time when the mobile phone 4 receives the SPP connection request signal from the data communication module 2, the mobile phone 4 transmits either an SPP connection permission signal or an SPP connection rejection signal depending on the configurations of the mobile phone 4 (see FIGS. 3 and 4). If the BT connection unit 26 of the mobile phone 4 is configured to be capable of performing the multi-point connection, the mobile phone 4 sends the SPP connection permission signal to the data communication module 2 to acknowledge the SPP connection request from the data communication module 2 (see FIG. 3). If, on the other hand, the BT connection unit 26 of the mobile phone 4 is configured to be not capable of performing the multi-point connection, the mobile phone 4 sends the SPP connection rejection signal to the data communication module 2 reject the SPP connection request from the data communication module 2 (see FIG. 4).

When the control unit 5 determines that after the SPP connection request signal is transmitted from the BT connection unit 6 and the SPP connection process is initiated, the SPP connection permission signal from the mobile phone 4 is received by the BT connection unit 6, and determines that the SPP connection process is normally finished (the SPP connection process is successfully performed) ("YES" at S8), the SPP is switched in a SPP connected state in which the SPP is connected between the BT connection unit 6 and the BT connection unit 26. Additionally, the data communication module 2 switches to a data communication performable state in which data communication can be performed between the BT connection unit 6 and the BT connection unit 26. In other words, the mobile phone 4 becomes able to perform hands-free communication with the navigation module 3 and data communication with the data communication module 2 (S9).

When the control unit 5 determines that after the SPP connection request signal is transmitted from the BT connection unit 6 and the SPP connection process is initiated, the SPP connection rejection signal from the mobile phone 4 is received by the BT connection unit 6 and determines that the SPP connection process is not normally finished (the SPP connection process is not successfully performed) (NO at S8), the SPP is not switched to the SPP connected state in which the SPP is connected between the BT connection unit 6 and the BT connection unit 26. Additionally, the data communication module 2 does not switch to the data communication performable state (S10) in which the data communication can be performed between the BT connection unit 6 and the BT connection unit 26. Because of this, the mobile phone 4 can perform the hands-free communication with the navigation module 3 but cannot perform the data communication with the data communication module 2.

Figure 5:
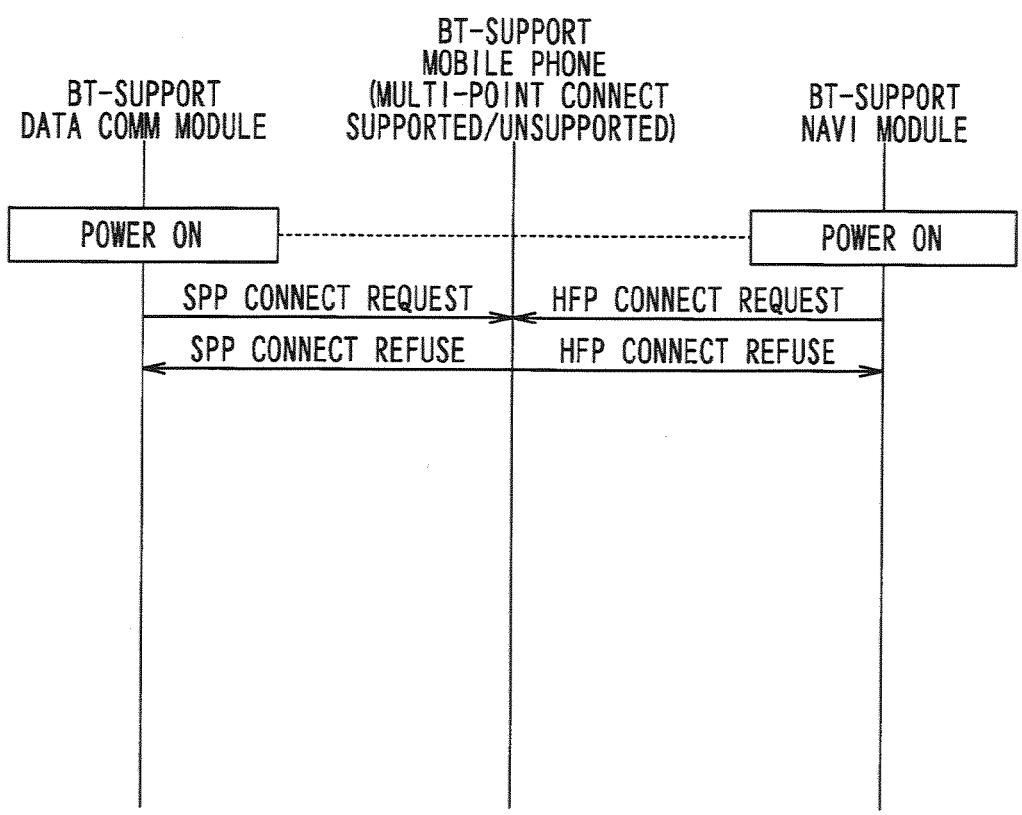
FIG. 5 is a sequence diagram of a data communication module, a mobile phone and a navigation module when a HFP connection process and a SPP connection process are performed immediately after the turn on of the navigation module 3 and the data communication module.

Now, let us consider a comparison example in which the BT communication system 1 is configured, as shown in FIG. 5, to initiate the HFP connection process immediately after the turn on of the navigation module 3 and initiate the SPP connection process immediately after the turn on of the data communication module 2. In this configuration, the mobile phone 4 transmits the HFP connection rejection signal to the navigation module 3 and transmits the SPP connection rejection signal to the data communication module 2, and thus, neither the hands-free communication function nor the data communication function can be provided (enjoyed) regardless of whether or not the mobile phone 4 is configured to be capable of the performing the multi-point connection.

Figure 6:
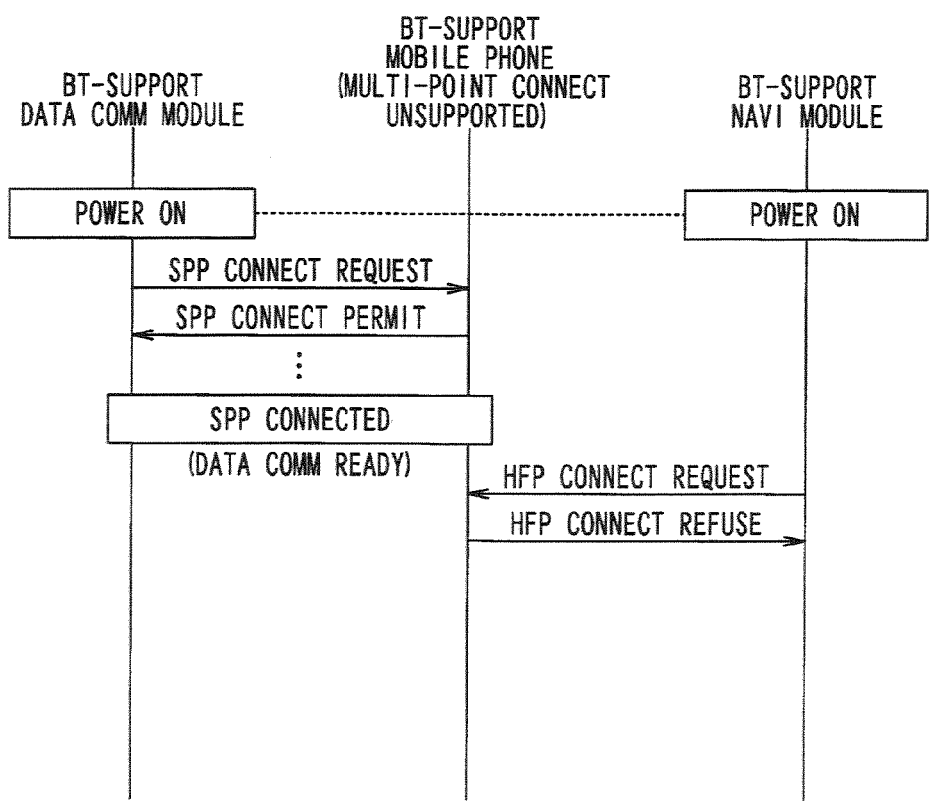
FIG. 6 is a sequence diagram of a data communication module, a mobile phone and a navigation module when a SPP connection process is initiated upon turn on of the data communication module and a HFP connection process is initiated after elapse of a predetermined period of time from the turn on of the navigation module.

In another example, the BT communication system 1 may be configured, as shown in FIG. 6, to initiate the SPP connection process immediately after the turn on of the data communication module 2 and initiate the HFP connection process after the elapse of the predetermined period of time from the turn on of the navigation module 3. In this configuration, if the mobile phone 4 is configured to not be capable of performing the multi-point connection, the mobile phone 4 transmits the HFP connection rejection signal to the navigation module 3. As a result, the data communication function, which has a lower priority than the hands-free communication function, can be provided (enjoyed) but the hands-free communication function, which has a higher priority than the data communication function, cannot be provided (enjoyed).

In view of the above circumstances, in the present embodiment, the BT communication system 1 is configured, as shown in FIGS. 3 and 4, to initiate the HFP connection process immediately after the turn on of the navigation module 3 and initiate the SPP connection process after the elapse of the first predetermined time from the turn on of the data communication module 2. Therefore, if the mobile phone 4 is configured to be capable of performing the multi-point connection, both the hands-free communication function and the data communication function can be provided (enjoyed). Further, even if the mobile phone 4 is configured not to be capable of the multi-point connection, the hands-free communication function, which has a higher priority than the data communication function, can be provided although the data communication function, which has a lower priority than the hands-free communication function, cannot be provided. In short, the connection process for the low-priority profile is initiated at a time that is outside a period during which the connection process for the high-priority profile is performed. In this way, the function of the high-priority profile can be certainly provided Moreover, if, for instance, the control unit 5 determines that the ACC switch 15 is changed from ON to OFF as the key inserted into the key cylinder is rotated from the IG position to the off position by the user ("YES" at S2) while the data communication module 2 is operating in the normal operating state, the control unit 5 changes the data communication module 2 from the normal operating state to the low power consumption operating state (S11), so that the data communication module 2 operates in the low power consumption operating state.

Next, the control unit 5 determines whether the BT communication link to the mobile phone 4 can be established (S12). Specifically, the control unit 5 causes the BT connection unit 6 to transmit a search signal and searches for an apparatus registered as a BT communication destination. If the control unit 5 determines that the mobile phone 4 is turned on and carried into the vehicle, and that the search response signal from the mobile phone 4 is received by the BT connection unit 6, the control unit 5 determines that the BT communication link to the mobile phone 4 can be established ("YES" at S12). At S13, the control unit 5 starts a timer for counting the second predetermined time (power-off-case wait time). At S14, the control unit 5 determines whether the second predetermined time is up (has elapsed). In other words, the control unit 5 determines whether the time counted by the timer reaches the second predetermined time.

When the control unit 5 determines that the second predetermined time has elapsed ("YES" at S14), the control unit 5 initiates the BT communication link connection process of connecting the BT communication link between the BT connection unit 6 and the BT connection unit 26. If the control unit 5 determines that the BT communication link connection process is normally finished and that the BT communication link is successfully connected, the control unit 5 causes the BT connection unit 6 to transmit the SPP connection request signal and initiates the SPP connection process of connecting the SPP between the BT connection unit 6 and the BT connection unit 26 (S15).

Figure 7:
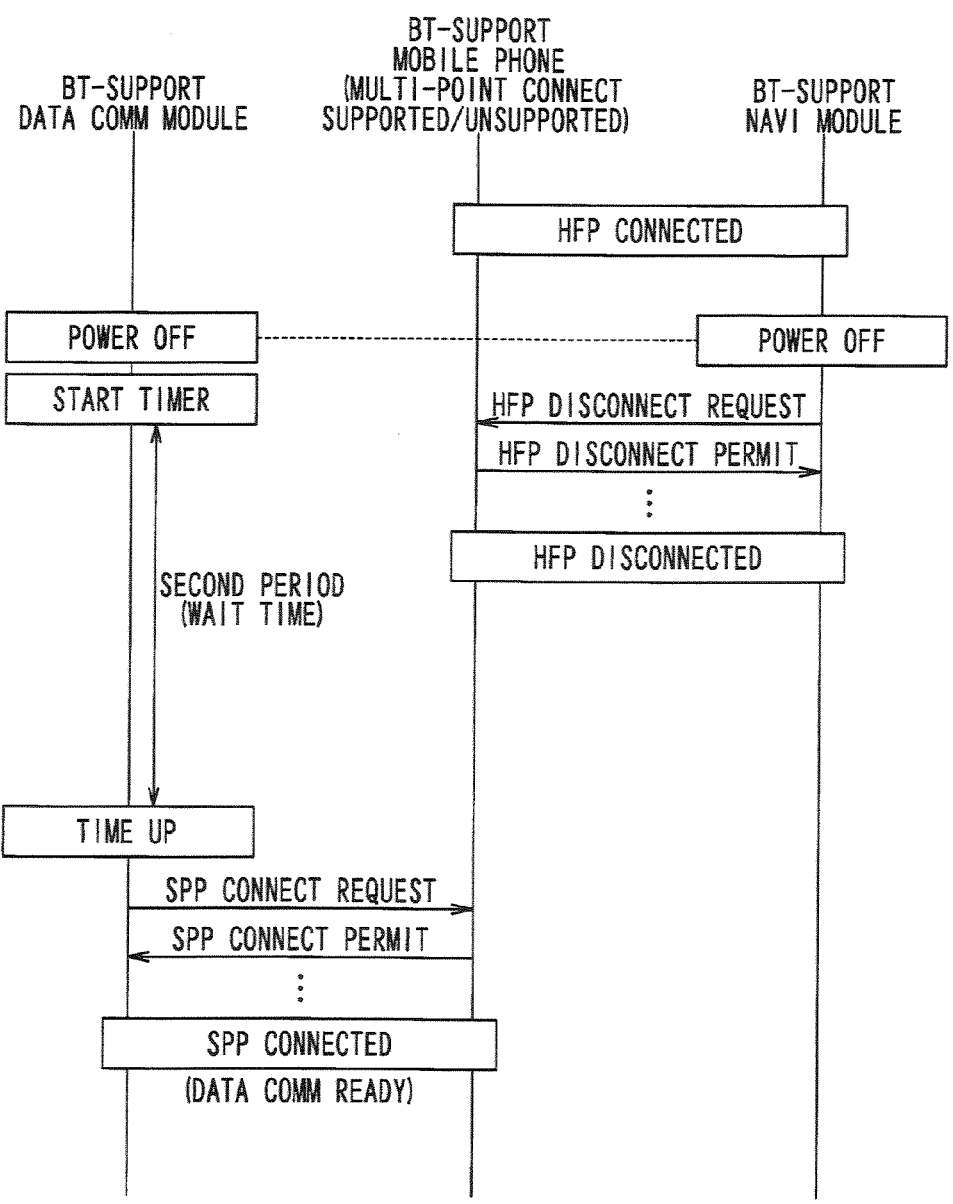
FIG. 7 is a sequence diagram of a data communication module, a mobile phone and a navigation module when a HFP disconnection process is initiated upon turn off of the navigation module and a SPP connection process is initiated after elapse of a second predetermined time from turn off of the data communication module 2.

When the HFP disconnection process has been normally finished and the HFP between the mobile phone 4 and the navigation module 3 has been disconnected at a time when the mobile phone 4 receives the SPP connection request signal from the data communication module 2, the mobile phone 4 transmits the SPP connection permission signal the data communication module to acknowledge the SPP connection request regardless of whether or not the BT connection unit 26 of the mobile phone 4 is configured to be capable of performing the multi-point connection (see FIG. 7).

After the control unit 5 causes the BT connection unit 6 to transmit the SPP connection request signal and initiates the SPP connection process, the control unit determines whether or not the SPP connection process is normally finished (successfully performed). When the control unit 5 determines that the SPP connection permission signal from the mobile phone 4 is received by the BT connection unit 6 and the SPP connection process is normally finished (corresponding to "YES" at S16), the control unit 5 switches the SPP to the SPP connected state in which the SPP is connected between the BT connection unit 6 and the BT connection unit 26, and additionally, the control unit 5 switches to the data communication performable state (S17) in which the data communication is performable between the BT connection unit 6 and the BT connection unit 26. In other words, the data communication becomes performable between the data communication module 2 and the mobile phone 4.

After the control unit 5 causes the BT connection unit 6 to transmit the SPP connection request signal to initiate the SPP connection process, the control unit 5 may determine that the SPP connection rejection signal from the mobile phone 4 is received by the BT connection unit 6 and that the SPP connection process is abnormally ended ("NO" at S16), the control unit 5 does not switch the SPP to the SPP connected state in which the SPP is connected between the BT connection unit 6 and the BT connection unit 26, and additionally, the control unit 5 does not switch to the data communication performable state (S18) in which the data communication is performable between the BT connection unit 6 and the BT connection unit 26. In other words, the data communication does not become performable between the data communication module 2 and the mobile phone 4.

Figure 8:
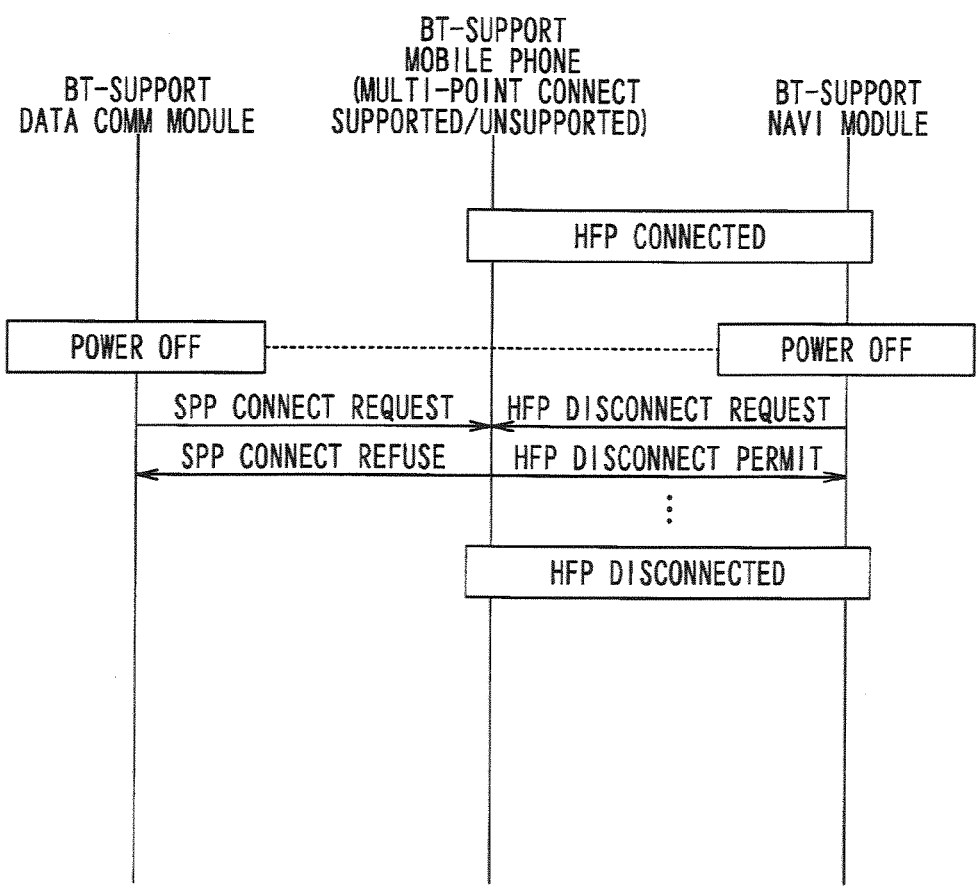
FIG. 8 is a sequence diagram illustrating operations of a data communication module, a mobile phone and a navigation module when a HFP disconnection process is performed upon turn off of the navigation module 3 and a SPP connection process is performed immediately after turn off of the data communication module.

Specifically, as shown in FIG. 8, if the BT communication system 1 is configured, to initiate the HFP disconnection process immediately after the turn off of the navigation module 3 and initiate the SPP connection process immediately after the turn off of the data communication module 2, the data communication function cannot be provided. This is because the mobile phone 4 transmits the SPP connection rejection signal to the data communication module 2 regardless of whether the mobile phone 4 is configured to be capable of performing the multi-point connection.

In view of the above circumstances, in the present embodiment, the BT communication system 1 is configured, as follows. As shown in FIG. 7, the BT communication system 1 initiates the HFP disconnection process immediately after the turn off of the navigation module 3 and initiates the SPP connection process after the elapse of the second predetermined time from the turn off of the data communication module 2. Therefore, the data communication function can be provided regardless of whether or not the mobile phone 4 is configured to be capable of performing the multi-point connection. In short, the connection process for any profile is initiated at a time that is outside a period during which the connection process for another profile is performed. In this way, the function of any profile can be certainly provided In the above embodiment, it is assumed that the HFP and SPP are connected. However, the above embodiment is applicable to not only the connecting of the HFP and SPP but also the connecting of, for example, the MAP, the PBAP, a DUN (dial-up networking profile) for dial-up connection to the Internet, an OPP (object push profile) for transfer of phone book data, an A2DP (advanced audio distribution profile) for transfer of music data, an AVRCP (audio/video remote control profile), and the like. In other words, the above embodiment is applicable to a combination of any profiles as far as the BT communication system 1 is configured to connect a low-priority profile such that the connecting of the low-priority profile does not cause the failure to connect a high-priority profile (so that the high-priority profile is successfully connected). Priority levels of the profiles may be user-definable or may be defined in accordance with the order in which the modules are mounted to the vehicle. Further, a plurality of profiles may be connected and disconnected by the connection process and disconnection process.

Moreover, in the above embodiment, it is assumed that two apparatuses, namely, the data communication module 2 and the navigation module 3, issue a profile connection request to one mobile phone 4. However, the above embodiment is also applicable to a case where three or more apparatuses issue a profile connection request to one mobile phone 4. More specifically, the foregoing description is also applicable to a case where, for example, three apparatuses, namely, apparatuses A, B, and C, issue a profile connection request to one mobile phone 4. When the three apparatuses, namely, apparatuses A, B and C, are powered on, the apparatus Awaits the first predetermined time before initiating the profile connection process. The first predetermined time can be determined from the following equation:

First predetermined time={number of apparatuses registered for apparatus $B$×search time for one apparatus+profile connection processing time required for apparatus $B$ to connect a profile}+{number of apparatuses registered for apparatus $C$×search time for one apparatus+profile connection processing time required for apparatus $C$ to connect a profile}

When the three apparatuses, namely, apparatuses A, B, and C, are turned off, the apparatus A waits the second predetermined time to initiate a profile connection process. The second predetermined time can be determined from the following equation:

Second predetermined time=profile disconnection processing time required for apparatus B to disconnect a connected profile+profile disconnection processing time required for apparatus C to disconnect a connected profile In addition, in the above embodiment, it is assumed that after the mobile phone 4 is turned on and carried into the vehicle, the ACC switch 15 changes from OFF to ON or from ON to OFF. However, the above embodiment is also applicable to a case where the mobile phone 4 changes from the power-off state to the power-on state immediately after the ACC switch 15 changes from off to on or the mobile phone 4 changes from the power-off state to the power-on state immediately after the ACC switch 15 changes from on to off.

As described above, in the present embodiment, the data communication module 2 initiates the SPP connection process of connecting the SPP to the mobile phone 4 so that the SPP connection process is initiated at a time that is outside a period during which the navigation module 3 is performing the HFP connection process of connecting the HFP to the mobile phone 4. Therefore, the SPP connection process can be performed without a conflict with the HFP connection process. Consequently, when the mobile phone 4 is configured to support the multi-point connection, the data communication function provided by the SPP can be provided while the hands-free communication function provided by the HFP is being provided. Meanwhile, even when the mobile phone 4 is configured not to support the multi-point connection, the hands-free communication function, which has a higher priority than the data communication function, can be provided.

Furthermore, the data communication module 2 initiates the SPP connection process of connecting the SPP to the mobile phone 4 so that the SPP connection process is initiated at a time that is outside a period during which the navigation module 3 is performing the HFP disconnection process of disconnecting the HFP connected to the mobile phone 4. Therefore, the SPP connection process can be performed without a conflict with the HFP disconnection process. Consequently, the data communication function provided by the SPP can be provided regardless of whether or not the mobile phone 4 is configured to support the multi-point connection.

The above-described embodiments do not limit embodiments, and can be modified or expanded in various ways, examples of which are as described below.

The short-range wireless communication apparatus is not limited to a vehicle-mounted module, but may be an apparatus that is not mounted to a vehicle. More specifically, apparatuses not mounted to a vehicle may be used in place of the data communication module 2 and the navigation module 3. Additionally, an apparatus capable of performing BT communication with an apparatus not mounted to a vehicle may be used in place of the mobile phone 4.

If the number of apparatuses registered as a BT communication destination for the navigation module 3 is unknown when the first predetermined time is to be determined, the first predetermined time may be determined on the presumption that the number of registered apparatuses is equal to its maximum permissible number.

The data communication module 2 may store information that indicates whether or not the mobile phone 4 is configured to support the multi-point connection. When the information indicates that the mobile phone 4 is configured to support the multi-point connection, the SPP connection process may be initiated after the elapse of the first predetermined time. When the information indicates that the mobile phone 4 is configured not to support the multi-point connection, the SPP connection process after the elapse of the first predetermined time may be prohibited from being initiated.

While the data communication module 2 is performing the SPP connection process, the display unit 29 and loudspeaker 32 of the mobile phone 4 may notify the user that the data communication module 2 is performing the SPP connection process.

In the above embodiment, the BT communication system 1 can correspond to a short-range wireless communication system. The BT supporting data communication module 2 can correspond to a short-range wireless communication apparatus. The control unit 5 can correspond to a control device and means. The connection unit 6 can correspond to a connection means and device. The ACC switch 15 can correspond to a predetermined switch. The BT connection unit 19 can correspond to a different connection device or means. The BT connection unit 26 can correspond to a communication-destination-side connection means or device. The display device 29 can correspond to a device means. Furthermore, each unit described (e.g., storage unit 7, handsfree communication function unit 22) can correspond to a corresponding device or means (storage device or means, handsfree communication function device or means).

The present disclosure has various aspects. For example, according to a first aspect, a short-range wireless communication apparatus can be configured as follows. The short-range wireless communication apparatus comprises: an own connection device that is capable of connecting a first predetermined communication protocol to a communication-destination-side connection device through a short-range wireless communication link; and a control device that performs a first connection process of connecting the first predetermined communication protocol between the own connection device and the communication-destination-side connection device. The control device performs the first connection process at a time that is outside a period during which a second connection process of connecting a second predetermined communication protocol between the communication-destination-side connection device and a different connection device is performed. The first and second predetermined communication protocols are different protocols. The different connection device is a connection device other than the own connection device and the communication-destination-side connection device.

According to the above configuration, the first connection process of connecting the first predetermined communication protocol can be performed while the second connection process of connecting the second predetermined communication protocol is not being performed. This makes it possible to prevent the first connection process from conflicting with the second connection process. Therefore, if the communication-destination-side connection device is configured to support a multi-point connection and thus can simultaneously connect predetermined communication protocols to a plurality of connection devices, it is possible to perform the second connection process and thereafter the first connection process of connecting the second predetermined communication protocol, and thus, it is possible to connect the first predetermined communication protocol while keeping the second predetermined communication protocol connected. Consequently, it becomes possible to provide both of a function of the first predetermined communication protocol and a function of the second predetermined communication protocol. If the communication-destination-side connection device is configured to not support the multi-point connection and thus cannot simultaneously connect the predetermined communication protocols to the plurality of connection devices, the function of the first predetermined communication protocol cannot be provided; however, the function of the second predetermined communication protocol can be provided. Thus, in this instance, the higher priority function can be provided when the second predetermined communication protocol has a higher priority than the first predetermined communication protocol.

The above short-range wireless communication apparatus may be configured as follows. After determining that a first predetermined time has elapsed since the second connection process was initiated, the control device initiates the first connection process. According to this configuration, by setting the first predetermined time longer than an estimated period of time required for the second connection process to be successfully finished, it becomes possible to perform the first connection process of connecting the first predetermined communication protocol without confliction with the second connection process of connecting the second predetermined communication protocol.

The above short-range wireless communication apparatus may be configured as follows. The first predetermined time is defined as Nc×Ts+Tc, where Nc is the number of communication-destination-side connection devices each connectable to the different connection device through the short-range wireless communication link, Ts is a search time for searching for each communication-destination-side connection device, and Tc is a connection processing time required from initiation of the second connection process to successful finish of the second connection process. Because of this, it becomes possible to certainly perform the first connection process of connecting the first predetermined communication protocol without conflict with the second connection process of connecting the second predetermined communication protocol.

The above short-range wireless communication apparatus may be configured as follows. Upon determining that a connection state between the own connection device and the communication-destination-side connection device is changed from a short-range wireless communication link unconnectable state to a short-range wireless communication link connectable state, the control device determines that the second connection process is initiated. After determining that the first predetermined time has elapsed since the second connection process was initiated, the control device initiates the first connection process.

According to this configuration, even when the timing at which the second connection process initiates cannot be directly determined, the timing at which the second connection process is initiated can be indirectly determined by determining the timing at which the connection state between the connection device and the communication-destination-side connection device is changed form the short-range wireless communication link unconnectable state to the short-range wireless communication link connectable state. Because of this, it becomes possible to accurately determine the timing at which the first connection process is to be initiated.

The above short-range wireless communication apparatus may be configured as follows. The own connection device and the different connection device are configured to become able and unable to connect the short-range wireless communication link in accordance with whether a predetermined switch mounted to a vehicle is turned on and off. Upon determining that the predetermined switch is changed from OFF to ON, the control device determines that the connection state between the own connection device and the communication-destination-side connection device is changed from the short-range wireless communication link unconnectable state to the short-range wireless communication link connectable state.

According to this configuration, the timing at which the connection state between the connection device and the communication-destination-side connection device is changed from the short-range wireless communication link unconnectable state to the short-range wireless communication link connectable state can be determined by determining the timing at which the predetermined switch mounted to the vehicle changes from OFF to ON. Because of this, it becomes possible to accurately determine the timing at which the first connection process is to be initiated.

The above short-range wireless communication apparatus may be configured as follows. The own connection device is capable of connecting a data communication protocol to the communication-destination-side connection device through the short-range wireless communication link. The data communication protocol provides a data communication function. The control device performs a data communication protocol connection process of connecting the data communication protocol between the own connection device and the communication-destination-side connection device. The control device performs the data communication protocol connection process at a time that is outside a period during which a hands-free communication protocol connection process of connecting a hands-free communication protocol between the different connection device and the communication-destination-side connection device through the short-range wireless communication link is performed. The hands-free communication protocol provides a hands-free communication function.

According to this configuration, the data communication protocol connection process of connecting the data communication protocol can be performed without conflict with the hands-free communication protocol connection process of connecting the hands-free communication protocol. Therefore, if the communication-destination-side connection device supports the multi-point connection and thus can simultaneously connect the predetermined communication protocols to a plurality of connection devices, it is possible to perform the data communication protocol connection process after performing the hands-free communication protocol connection process, and thus, it is possible to the data communication protocol while keeping the hands-free communication protocol connected. Therefore, both the data communication function and the hands-free communication function can be provided. If, on the other hand, the communication-destination-side connection device does not support the multi-point connection and thus cannot simultaneously connect the predetermined communication protocols to the plurality of connection devices, the hands-free communication function having a higher priority than the data communication function can be provided although the data communication function cannot be provided.

The above short-range wireless communication apparatus may be included in a short-range wireless communication system equipped with a notification device that, when the control device is performing the first connection process, notifies that the control device is performing the first connection process. This makes it possible to notify a user that the first connection process is being performed.

According to a second aspect of the present disclosure, a short-range wireless communication apparatus can be configured as follows. The short-range wireless communication apparatus comprises: a own connection device that is capable of connecting a first predetermined communication protocol to a communication-destination-side connection device through a short-range wireless communication link; and a control device that performs a connection process of connecting the first predetermined communication protocol between the own connection device and the communication-destination-side connection device. The control device performs the connection process at a time that is outside a period during which a disconnection process of disconnecting a second predetermined communication protocol, which is connected between the communication-destination-side connection device and a different connection device through the short-range wireless communication link, is performed. The first and second predetermined communication protocols are different protocols. The different connection device is a connection device other than the own connection device and the communication-destination-side connection device.

According to the above short-range wireless communication apparatus, the connection process of connecting the first predetermined communication protocol can be performed at the time that is outside the period during which the disconnection process of disconnecting the connected second predetermined communication protocol is performed. Thus, the connection process can be performed without conflict with the disconnection process, Therefore, the first predetermined communication protocol can be connected after the disconnection of the second predetermined communication protocol, regardless of whether the communication-destination-side connection device is configured to support the multi-point connection or not (whether the communication-destination-side connection device can simultaneously connect predetermined communication protocols to a plurality of connection device). Therefore, it is possible to provide a function of the first predetermined communication protocol.

The above short-range wireless communication apparatus may be configured as follows. After determining that a second predetermined time has elapsed since the disconnection process was initiated, the control device initiates the connection process. According to this configuration, by setting the second predetermined time longer than an estimated period of time required for the disconnection process to be successfully finished, it becomes possible to perform the connection process of connecting the first predetermined communication protocol without confliction with the disconnection process of disconnecting the connected second predetermined communication protocol.

The above short-range wireless communication apparatus may be configured as follows. The second predetermined time is a disconnection processing time required from initiation of the disconnection process to successful finish of the disconnection process. According to this configuration, it becomes possible to certainly perform the connection process of connecting the first predetermined communication protocol without conflict with the disconnection process of disconnecting the connected second predetermined communication protocol.

The above short-range wireless communication apparatus may be configured as follows. Upon determining that a connection state between the own connection device and the communication-destination-side connection device is changed from a short-range wireless communication link connectable state to a short-range wireless communication link unconnectable state, the control device determines that the disconnection process is initiated. After determining that the second predetermined time has elapsed since the disconnection process was initiated, the control device initiates the connection process.

According to the above configuration, even if the timing at which the disconnection process is initiated cannot be directly determined, the timing at which the disconnection process is initiated can be indirectly determined by determining the timing at which the connection state between the own connection device and the communication-destination-side connection device is changed from the short-range wireless communication link connectable state to the short-range wireless communication link unconnectable state. This makes it possible to accurately determine the timing at which the connection process is to be initiated.

The above short-range wireless communication apparatus may be configured as follows. The own connection device and the other connection device are configured to become able and unable to connect the short-range wireless communication link in accordance with whether a predetermined switch mounted to a vehicle is turned on and off. Upon determining that the predetermined switch is changed from on to off, the control device determines that the connection state between the own connection device and the communication-destination-side connection device is changed from the short-range wireless communication link connectable state to the short-range wireless communication link unconnectable state.

According to this configuration, the timing at which the connection state between the own connection device and the communication-destination-side connection device is changed from the short-range wireless communication link connectable state to the short-range wireless communication link unconnectable state can be determined by determining the timing at which the predetermined switch mounted to the vehicle changes from on to off. This makes it possible to accurately determine the timing at which the connection process is to be initiated.

The above short-range wireless communication apparatus may be configured as follows. The own connection device is capable of connecting a data communication protocol to the communication-destination-side connection device through the short-range wireless communication link. The data communication protocol provides a data communication function. The control device performs a data communication protocol connection process of connecting the data communication protocol between the own connection device and the communication-destination-side connection device. The control device performs a data communication protocol connection process at a time that is outside a period during which the disconnection process of disconnecting a hands-free communication protocol, which is connected between the own connection device and the communication-destination-side connection device through the short-range wireless communication link, is performed. The hands-free communication protocol provides a hands-free communication function.

According to this configuration, the data communication protocol connection process of connecting the data communication protocol can be performed without conflict with the hands-free communication protocol disconnection process of disconnecting the hands-free communication protocol. Therefore, it becomes possible to connect the data communication protocol after disconnection the hands-free communication protocol and it becomes possible to provide the data communication function regardless of whether the communication-destination-side connection device is configured to support the multi-point connection or not (whether the communication-destination-side connection device can simultaneously connect predetermined communication protocols to a plurality of connection device).

The above short-range wireless communication apparatus may be included in a short-range wireless communication system equipped with a notification device that, when the control device is performing the connection process, notifies that the control device is performing the connection process. This system makes it possible to notify the user that the connection process is being performed.

While the present disclosure has been described with reference to embodiments thereof, it is to be understood that the disclosure is not limited to the embodiments and constructions. The present disclosure is intended to cover various modification and equivalent arrangements. In addition, while the various combinations and configurations, other combinations and configurations, including more, less or only a single element, are also within the spirit and scope of the present disclosure.

What is claimed is:

1. A short-range wireless communication apparatus for a vehicle, comprising:
   a first on-board connection device fixedly mounted to the vehicle to which a second on-board connection device is fixedly mounted, the first on-board connection device is different than the second on-board connection device, wherein the first on-board connection device is configured to initiate a first connection process of connecting through a short-range wireless communication link a first predetermined communication protocol to a portable terminal to which the second on-board connection device initiates a second connection process that connects through a short-range wireless communication link a second predetermined communication protocol; and
   a control device controlling the first connection process and causing the first on-board connection device to initiate the first connection process of connecting the first predetermined communication protocol to the portable terminal after the control device determines that a first predetermined time has elapsed since the second on-board connection device initiated the second connection process of connecting the second predetermined communication protocol to the portable terminal,
   wherein
       the first and second predetermined communication protocols are different protocols,
       the first on-board connection device is a short-range communication connection unit of a data communication module fixedly mounted to the vehicle,
       the second on-board connection device is a short-range communication connection unit of a navigation module fixedly mounted to the vehicle,
       the first on-board connection device and the second on-board connection device are communicably coupled via a vehicle network,
       based on a determination as to a change in a connection state between the first on-board connection device and the portable terminal, the control device determines whether the second connection process of connecting the second predetermined protocol between the second on-board connection device and the portable terminal is initiated,
       upon determining that the connection state between the first on-board connection device and the portable terminal is changed from a short-range wireless communication link unconnectable state to a short-range wireless communication link connectable state, the control device determines that the second connection process is initiated, and
       after determining that the first predetermined time has elapsed since the second connection process was initiated, the control device initiates the first connection process.

2. The short-range wireless communication apparatus according to claim 1, wherein:
   the first predetermined time is a sum of:
       a product of
           a total number of portable terminals connectable to the second on-board connection device through the short-range wireless communication link and
           a search time for searching for one portable terminal; and
       a connection processing time required from the initiation of the second connection process to successful finish of the second connection process.

3. The short-range wireless communication apparatus according to claim 1, wherein:
   the first on-board connection device and the second on-board connection device are configured to become able and unable to connect the short-range wireless communication link in accordance with ON and OFF of a predetermined switch mounted to the vehicle; and
   upon determining that the predetermined switch is changed from the OFF to the ON, the control device determines that the connection state between the first on-board connection device and the portable terminal is changed from the short-range wireless communication link unconnectable state to the short-range wireless communication link connectable state.

4. The short-range wireless communication apparatus according to claim 1, wherein:
   the first on-board connection device is capable of connecting a data communication protocol, which provides a data communication function, to the portable terminal through the short-range wireless communication link; and
   the control device initiates a data communication protocol connection process of connecting the data communication protocol between the first on-board connection device and the portable terminal through the short-range wireless communication link after the control device determines that the first predetermined time has elapsed since initiation of a hands-free communication protocol connection process of connecting a hands-free communication protocol between the portable terminal and the second on-board connection device through the short-range wireless communication link, wherein the hands-free communication protocol provides a hands-free communication function.

5. The short-range wireless communication apparatus according to claim 1, wherein:
   in response to power-on of the navigation module, the navigation module automatically initiates the second connection process of connecting the second predetermined communication protocol to the portable terminal through the short-range wireless communication link; and
   by determining a timing at which the navigation module changes from a power-off state to a power-on state, the control device determines whether or not the first predetermined time has elapsed since the initiation of the second connection process.

6. The short-range wireless communication apparatus according to claim 1, wherein:

the first predetermined communication protocol is a data communication protocol that provides a data communication function, the second predetermined communication protocol is a hands: free communication protocol that provides a hands-free communication function and that is defined as higher in priority level than the data communication protocol, and the first on-board connection device initiates the first connection process of connecting the data communication protocol to the portable terminal after the first predetermined time has elapsed since the second on-board connection device initiated the second connection process of connecting the hands: free communication protocol that is higher in the priority level than the data communication protocol, to the portable terminal.

7. The short-range wireless communication apparatus according to claim 1 further comprising:

an operation input unit that outputs an input operation detection signal to the control devices and sets the first predetermined time in the control device in accordance with an operation from a user, wherein the control device includes a timer that starts counting when the control device determines that the first on-board connection device receives a search response signal from the portable terminal, and when the control device determines that the timer reaches the first predetermined time, the control device initiates to connect the short-range wireless connection link between the first on-board connection device and the portable terminal and initiates to connect the first predetermined communication protocol between the first on-board connection device and the portable terminal.

8. The short-range wireless communication apparatus according to claim 1 further comprising:

an operation input unit receiving an input from a user and setting the first predetermined time in the control device in accordance with the input from the user.

9. A short-range wireless communication system for a vehicle, comprising:

a short-range wireless communication apparatus comprising:

a first on-board connection device fixedly mounted to the vehicle to which a second on-board connection device is fixedly mounted, the first on-board connection device is different than the second on-board connection device, wherein the first on-board connection device is configured to initiate a first predetermined communication protocol to a portable terminal to which the second on-board connection device initiates a second connection process that connects through a short-range wireless communication link a second predetermined communication protocol, and a control device controlling the first communication process and causing the first on-board connection device to initiate the first connection process of connecting the first predetermined communication protocol to the portable terminal; and a notification device notifying that the control device is performing the first connection process when the control device is performing the first connection process, wherein the first on-board connection device is a short-range communication connection unit of a data communication module fixedly mounted to the vehicle, the second on-board connection device is a short-range communication connection unit of a navigation module fixedly mounted to the vehicle, the control device initiates the first connection process after the control device determines that a first predetermined time has elapsed since the second on-board connection device initiated the second connection process of connecting the second predetermined communication protocol to the portable terminal, the first and second predetermined communication protocols are different protocols, the first on-board connection device and the second on-board connection device are communicably coupled via a vehicle network, based on a determination as to a change in a connection state between the first on-board connection device and the portable terminal, the control device determines whether the second connection process of connecting the second predetermined protocol between the second on-board connection device and the portable terminal is initiated, upon determining that the connection state between the first on-board connection device and the portable terminal is changed from a short-range wireless communication link unconnectable state to a short-range wireless communication link connectable state, the control device determines that the second connection process is initiated, and after determining that the first predetermined time has elapsed since the second connection process was initiated, the control device initiates the first connection process.

10. A short-range wireless communication apparatus for a vehicle, comprising:

a first on-board connection device fixedly mounted to the vehicle to which a second on-board connection device is fixedly mounted, the first on-board connection device is different than the second on-board connection device, wherein the first on-board connection device is configured to initiate a connection process of connecting through a short-range wireless communication link a first predetermined communication protocol to a portable terminal to which the second on-board connection device connects through a short-range wireless communication link a second predetermined communication protocol; and a control device controlling the connection process and causing the first on-board connection device to initiate the connection process of connecting the first predetermined communication protocol to the portable terminal after the control device determines that a first predetermined time has elapsed since the second on-board connection device initiated a disconnection process of disconnecting the second predetermined communication protocol connected between the second on-board connection device and the portable terminal, wherein the first and second predetermined communication protocols are different protocols, the first on-board connection device is a short-range communication connection unit of a data communication module fixedly mounted to the vehicle, the second on-board connection device is a short-range communication connection unit of a navigation module fixedly mounted to the vehicle, the first on-board connection device and the second on-board connection device are communicably coupled via a vehicle network, based on a determination as to a change in a connection state between the first on-board connection device and the portable terminal, the control device determines whether the disconnection process of disconnecting the second predetermined protocol connected between the second-onboard connection device and the portable terminal is initiated, upon determining that the connection state between the first on-board connection device and the portable terminal is changed from a short-range wireless communication link connectable state to a short-range wireless communication link unconnectable state, the control device determines that the disconnection process is initiated, and after determining that the first predetermined time has elapsed since the initiation of the disconnection process, the control device initiates the connection process.

11. The short-range wireless communication apparatus according to claim 10, wherein:

the first predetermined time is a disconnection processing time required from the initiation of the disconnection process to successful finish of the disconnection process.

12. The short-range wireless communication apparatus according to claim 10, wherein the first on-board connection device and the second on-board connection device are configured to become able and unable to connect the short-range wireless communication link in accordance with ON and OFF of a predetermined switch mounted to the vehicle; and upon determining that the predetermined switch is changed from the ON to OFF, the control device determines that the connection state between the first on-board connection device and the portable terminal is changed from the short-range wireless communication link connectable state to the short-range wireless communication link unconnectable state.

13. The short-range wireless communication apparatus according to claim 10, wherein:

the first on-board connection device is capable of connecting a data communication protocol, which provides a data communication function, to the portable terminal through the short-range wireless communication link; and the control device initiates a data communication protocol connection process of connecting the data communication protocol between the first on-board connection device and the portable terminal after the control device determines that the first predetermined time has elapsed since initiation of a hands-free communication protocol disconnection process of disconnecting a hands-free communication protocol connected between the second on-board connection device and the portable terminal through the short-range wireless communication link, wherein the hands-free communication protocol provides a hands-free communication function.

14. The short-range wireless communication apparatus according to claim 10, wherein:

in response to power-off of the navigation module, the navigation module automatically initiates the disconnection process of disconnecting the second predetermined communication protocol connected between the short: range communication unit of the navigation module and the portable terminal through the short-range wireless communication link; and by determining a timing at which the navigation module changes from a power-on state to a power-off state, the control device determines whether or not the second predetermined time has elapsed since the initiation of the disconnection process.

15. A short-range wireless communication system for a vehicle, comprising:

a short-range wireless communication apparatus comprising:

a first on-board connection device fixedly mounted to the vehicle to which a second on-board connection device is fixedly mounted, the first on-board connection device is different than the second on-board connection device, wherein the first on-board connection device is configured to initiate a connection process of connecting through a short-range wireless communication link a first predetermined communication protocol to a portable terminal to which the second on-board connection device connects through a short-range wireless communication link a second predetermined communication protocol, and a control device controlling the first communication process and causing the first on-board connection device to initiate the connection process of connecting the first predetermined communication protocol to the portable terminal; and a notification device notifying that the control device is performing the connection process when the control device is performing the connection process, wherein the control device initiates the connection process after the control device determines that a first predetermined time has elapsed since the second on-board connection device initiated a disconnection process of disconnecting the second predetermined communication protocol connected between the second on-board connection device and the portable terminal, the first and second predetermined communication protocols are different protocols, the first on-board connection device is a short-range communication connection unit of a data communication module fixedly mounted to the vehicle, the second on-board connection device is a short-range communication connection unit of a navigation module fixedly mounted to the vehicle, the first on-board connection device and the second on-board connection device are communicably coupled via a vehicle network, based on a determination as to a change in a connection state between the first on-board connection device and the portable terminal, the control device determines whether the disconnection process of disconnecting the second predetermined protocol connected between the second on-board connection device and the portable terminal is initiated, upon determining that the connection state between the first on-board connection device and the portable terminal is changed from a short-range wireless communication link connectable state to a short-range wireless communication link unconnectable state, the control device determines that the disconnection process is initiated, and after determining that the first predetermined time has elapsed since the initiation of the disconnection process, the control device initiates the connection process.

* * * * *